March 12, 1935. T. E. LYONS Re. 19,497
INDUSTRIAL TRUCK
Original Filed Nov. 12, 1931
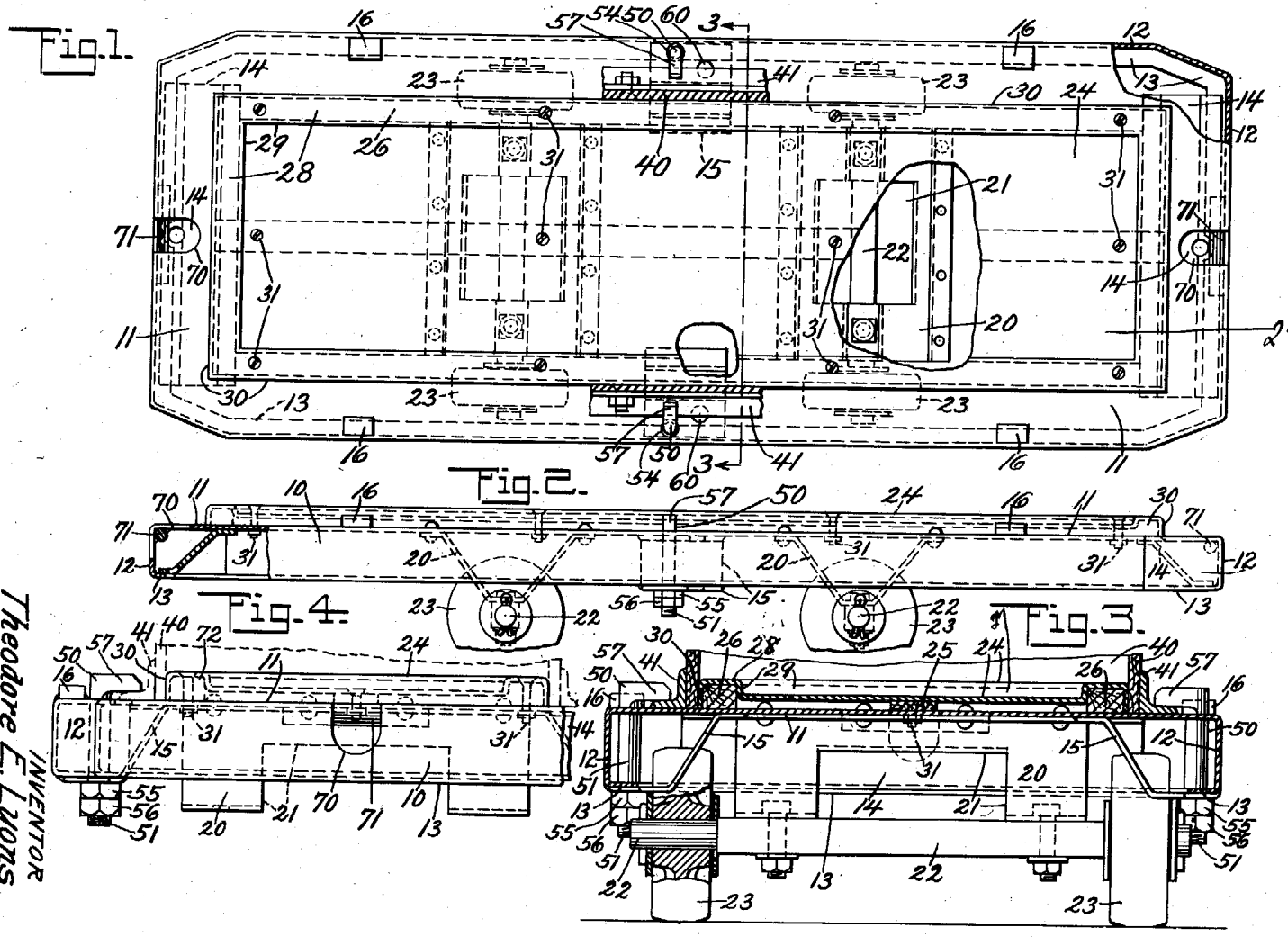
INVENTOR
Theodore E. Lyons
BY Donald U. Rich
ATTORNEY Reissued Mar. 12, 1935

Re. 19,497

UNITED STATES PATENT OFFICE 19,497

INDUSTRIAL TRUCK

Theodore E. Lyons, Jeffersonville, Ind., assignor to American Car and Foundry Company, New York, N. Y., a corporation of New Jersey Original No. 1,917,892, dated July 11, 1933, Serial No. 574,565, November 12, 1931. Application for reissue December 12, 1934, Serial No. 757,219

18 Claims. (Cl. 18—40)

This invention relates to soap trucks and with regard to certain more specific features thereof to trucks upon which soap frames are mounted for the molding of large soap cakes. After molding and removal of the frame the large cakes are transported on their respective trucks to other stations where the cakes are cut into a multiplicity of smaller units of commercial size.

Heretofore difficulty has existed in this type of device due to leakage of the soap emulsion at the union of the soap frame and the truck and in many cases frames composed of separate sides have been used, multiplying the leakage opportunities. In ordinary practice the soap emulsion contains caustic soda which acts to expand the emulsion body and further increase the difficulty in providing a suitable seal for the assembled parts.

It is one of the aims of the present invention to minimize the opportunity for leakage and provide a light-weight sturdy truck with which a soap frame may be quickly and conveniently associated for the reception and molding of the soap emulsion and from which the soap frame may be easily removed after the emulsion has solidified.

Another object of the invention is to provide a truck frame and molding bottom substantially of pressed metal correlated with wheeled axles and clamping means for the soap frame which shall be relatively simple in construction and inexpensive.

Another object is to provide an effective means for preventing displacement of the formed cakes after the molding frame or box has been removed and while the truck is subject to the shocks and movements of transportation.

Still another object is to provide a truck having a combined underframe and false bottom which may be quickly and conveniently modified by the interchanging of the false bottom for one of varying size, and in which clamping means are provided which are adjustable or easily alterable to accommodate either size of false bottom.

Other objects will be in part obvious and in part pointed out particularly hereinafter.

The invention accordingly consists in the various features of construction, combinations of elements and arrangements of parts which will be exemplified by the construction hereinafter set forth and the scope of the application of which will be indicated in the appended claims.

In the drawing wherein is shown one of various possible embodiments of the invention;

Figure 1 is a plan view of the improved soap truck with fragments of the soap frame indicated in clamped position;

Fig. 2 is a view on side elevation of the soap truck shown in Fig. 1, parts of the end of the truck being broken away to show more clearly the interior construction;

Fig. 3 is a view in cross section taken on the line 3—3, Fig. 1;

Fig. 4 is an end view of the truck substantially as shown in Figs. 1 and 2, but modified to take a soap frame of different size.

Referring now more particularly to the drawing, a truck underframe is indicated at 10. This is preferably of pressed metal having a horizontal flooring 11 and a marginal depending flange 12 which is slightly inturned at the bottom as indicated at 13. End braces 14 connect the lower side of the horizontal flooring with the inturned portions 13 of the flange 12. Side braces 15 correspondingly extend from the horizontal flooring of the underframe to the inturned portions 13 of the depending flange 12. Spaced lugs 16 are welded to the top of the horizontal flooring for purposes which will more fully hereinafter appear. Spaced pedestals 20 preferably of pressed metal are riveted to the flooring and depend therefrom, each being substantially cut away at 21 to lighten the construction. Bolted to the lower side of the pedestals 20 are axles 22 having suitable wheels 23 at either end thereof. These wheels may be of the plain or anti-friction bearing type as desired.

Mounted on the underframe is a molding element constituting a false bottom indicated generally at 24, said false bottom comprising a metal member formed of steel, aluminum, or the like, and supported in spaced relation with respect to the underframe flooring 11 by central and marginal timbers 25 and 26, respectively.

As shown clearly in section in Fig. 3, the molding element or false bottom 24 comprises a body portion or lading supporting floor 27 bounded by downwardly facing channel sections formed in the instance shown by a raised marginal region or bead 28 which defines a shoulder 29 between the floor 27 and the under surface of the bead 28. The edge portions of the false bottom 24 are formed by flanges 30 depending vertically from and forming parts of the bead 28. As clearly shown in Fig. 3, the lower edges of the flanges 30 are in a plane lower than the plane of the floor 27 and contact with the floor 11 of the underframe; this construction providing the spaced relationship between the floor 27 and the underframe flooring 11. The side portions of the false bottom 24, more particularly the downwardly facing channel side portions of said false bottom are so formed as to fit the timbers 26.

This lower molding element or false bottom is secured to the underframe by a series of stove bolts 31 which pass through the sheet metal flooring, the marginal regions, the central and marginal timbers and the flooring of the underframe. By the removal of these bolts and the substitution of a similarly constructed false bottom of different width the truck may be modified to mold soap cakes of another size and as will appear hereinafter, the clamping devices used are arranged for adjustment to operate on the different sized soap frame. This will involve, of course, the drilling of another series of holes in the underframe flooring for accommodation of the stove bolts.

Preferably the soap frame employed with the present truck is of the unit box type rather than the separable wall construction. The lower part of such a box is indicated at 40 and the opposite walls may be slightly tapered inwardly and upwardly to facilitate removal of the soap frame from the molded cake. Along each side wall of the box an angle iron 41 is secured having the lower surface of one angle face in alinement with the lower edge of the box. The soap frame is open at top and bottom and may be mounted on the underframe exteriorly of and adjacent to the edges 30 of the false bottom. A close contact is effected and where the box employs the tapered walls described the soap frame is practically wedged over the false bottom. Clamping devices 50 are provided on opposite sides of the underframe in the form of bolts 51 having shanks extending through the lower part of the side braces 15 and upwardly through apertures 54 in the underframe flooring 11. Each bolt is provided with a nut 55 and a lock nut 56 at its lower end and at its upper end is provided with an offset head 57 adapted to be swung into or out of engagement with the outwardly extending flanges of the angle iron 41. Tightening the nut 55 sets the offset head 57 down securely against the angle iron, clamping the soap frame to the underframe flooring with the wooden or composition walls of the soap frame in close engagement with the side edges of the false bottom 24. This effectively associates the soap frame with the truck in such a manner as to prevent the leakage of the soap emulsion even under the expanding influence of the caustic soda or other chemicals employed.

Another series of bolt holes is provided through the underframe flooring and side braces 15 as indicated at 60. These are set inwardly from the sides of the truck frame beyond the bolt holes 54 so that when the truck is modified to take a narrower bottom molding element the bolts 50 are removed from their positions in the holes 54 and inserted in the holes 60.

At each end of the truck an aperture is provided in the flooring 11 and depending flange 12 as indicated at 70. Across this aperture a bar 71 extends and is welded in the angle formed by the flooring and flange. This bar takes the coupling hooks not shown.

The downward pull of the closed clamping members presses the molding box or frame firmly against the underframe flooring and the lower part of the box is contacted interiorly by the top outer edge of the false bottom or lower molding element. In using a tapered box as previously described, for draft purposes, there is a wedging action which makes for a tight union of the box and false bottom.

In building or reconstructing the trucks for soap frames narrower than the one shown in Fig. 3 of the drawing, a narrower false bottom 72 is bolted to the underframe flooring (see Fig. 4) and the clamping bolts 50 are located in holes 60 where the offset heads are adapted to be swung into engagement with the angle irons of the narrower soap frame. The extra series of holes for the stove bolts which secure the false bottom in position may be originally provided for alternative assembly of the bottoms or they may be made at the time of reconstruction.

In using the above described truck the soap frame bordered at its lower edges with the angle iron construction 41 is applied over the false bottom 24 with its tapered walls closely fitting the edges of the false bottom. To provide for this assembly the offset heads 57 of the bolts 50 are swung out of the way and are later restored to position over the projecting lower flanges of the angle irons. When the soap frame is thus applied the spaced lugs 16 on opposite sides of the underframe flooring assist in locating the soap frame and the angle members at the lower part thereof lie within the spaced lugs. The nuts 55 are then screwed upon the bolts, firmly clamping the soap frame to the underframe flooring adjacent the edges of the false bottom or lower molding element. The lock nuts 56 are then operated to hold the bolts in position. With the soap frame assembled a soap emulsion is poured into the cavity formed by the false bottom and the soap frame. This emulsion eventually cools and solidifies, whereupon the clamping devices are loosened and the molding box removed from the truck. The molded soap cake is retained on the truck seated on the false bottom and held against slipping or dislocation by the engagement of the lower part of the soap cake with the depressed portion of the false bottom 24. The truck may then be moved to another station where the large cake is subjected to other treatments eventually dividing it into a multiplicity of small commercial units.

What is claimed is:

1. In a soap truck, an underframe, a false bottom fixedly secured thereto and provided with raised marginal regions, and means on the underframe for receiving the lower part of a soap frame and holding it against the underframe opposite the edges of the false bottom.

2. In a soap truck, an underframe, a false bottom thereon having raised marginal regions, and means on the underframe for receiving the lower part of a soap frame and holding it against the underframe opposite the edges of the false bottom, said means comprising clamping bolts having heads adjustable toward and from the said edges.

3. In a soap truck, a underframe, a false bottom thereon having raised marginal regions and a floor portion spaced from the underframe, and means on the underframe for receiving the lower part of a soap frame and holding it against the underframe opposite the edges of the false bottom.

4. In a soap truck, an underframe, a false bottom thereon having raised marginal regions and a floor portion spaced from the underframe, and means on the underframe for receiving the lower part of a soap frame and holding it against the underframe in engagement with the edges of the false bottom, said means comprising clamping bolts having heads adjustable toward and from the said edges.

5. In a soap truck, a pressed metal underframe, a pressed metal false bottom fixed thereon having a floor spaced from the underframe and raised marginal regions with substantially vertical edges, and clamping devices oppositely disposed with respect to the false bottom having provision for receiving a soap frame portion and holding it adjacent the edges of the false bottom.

6. In a soap truck, a pressed metal underframe, a pressed metal false bottom fixed thereon having a floor spaced from the underframe and raised marginal regions with substantially vertical edges, and clamping devices oppositely disposed with respect to the false bottom having provision for allowing a soap frame to be mounted on the underframe and for holding it against the underframe and against the edges of the false bottom.

7. In a soap truck, a pressed metal wheeled underframe including a floor, a pressed metal molding element mounted on said floor having raised margins and edges for contacting a soap frame, and clamping devices on the underframe adjustable to allow the positioning of the lower part of a soap frame exteriorly adjacent the edges of the said molding element and operable to clamp the said soap frame against the underframe adjacent the molding element.

8. In a soap truck, a pressed metal wheeled underframe including a floor, a pressed metal molding element mounted on said floor having raised margins and edges for contacting a soap frame, and clamping devices on the underframe adjustable to allow the positioning of the lower part of a soap frame exteriorly adjacent the edges of the said molding element and operable to clamp the said soap frame against the underframe adjacent the molding element, said devices comprising bolts movable to engage parts of the soap frame and means for tightening and securing said bolts when so engaged.

9. In a soap truck, a pressed metal wheeled underframe including a floor, a pressed metal molding element mounted on said floor having raised margins and edges for contacting a soap frame, and clamping devices on the underframe adjustable to allow the positioning of the lower part of a soap frame exteriorly adjacent the edges of the said molding element and operable to clamp the said soap frame against the underframe adjacent the molding element, said underframe being provided with means for relocating the clamping devices at different spaced points.

10. In a soap truck, the combination with an underframe of a molding element fixed to the upper portion thereof and having raised marginal portions constituting a positioning means for a soap frame.

11. In a soap truck, the combination with an underframe of a molding element fixedly secured to the upper portion thereof and arranged in spaced relation relative thereto, said molding element having raised marginal portions, a soap frame supported on the underframe in close fitting engagement with the said raised marginal portions and fastening elements carried by the underframe for releasably holding the soap frame in position.

12. A soap truck comprising in combination, an underframe, a soap molding element fixedly supported by the underframe in spaced relation relative to the top of the latter, said molding element being provided with raised marginal portions, and an open frame releasably supported on the underframe in close fitting engagement with the outer side portions of the said raised marginal portions.

13. In a soap truck, the combination with an underframe of a false bottom secured to the underframe and provided with marginal flanges constituting retaining means for positioning and cooperating with an open frame to provide a box adapted to receive soap emulsion.

14. As an article of manufacture, a molding element adapted to hold emulsions comprising a metal member having a main emulsion receiving portion and angular shaped marginal portions at the sides and ends thereof.

15. As an article of manufacture, a molding element adapted to hold emulsions comprising a metal member having a main emulsion receiving portion and channel shaped marginal portions at the edges thereof.

16. A molding element for use with trucks having supporting elements, said element being adapted to hold emulsions and comprising a metal member having an emulsion receiving portion and channel shaped marginal portions at the sides and ends thereof, said channel shaped portions at the sides being so formed as to receive said supporting elements.

17. A molding element for use with trucks having supporting elements, said elements being adapted to hold emulsions and comprising a pressed metal member having a bottom and raised marginal portions so formed as to provide downwardly opening channels at the sides of said element, the lower edges of the side walls of said element being in a plane below the bottom.

18. A molding element for use with trucks having supporting elements, said element being adapted to hold emulsions and comprising a pressed metal member having a bottom and raised marginal portions so formed as to provide downwardly opening channels at the sides and ends of said element, the lower edges of the side and end walls of said element being arranged in a plane below the bottom.

THEODORE E. LYONS.